(12) United States Patent
Kikuchi

(10) Patent No.: US 7,769,554 B2
(45) Date of Patent: Aug. 3, 2010

(54) INSTRUMENT CHECK SYSTEM

(75) Inventor: Yuichi Kikuchi, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 343 days.

(21) Appl. No.: 11/948,105

(22) Filed: Nov. 30, 2007

(65) Prior Publication Data

US 2008/0133159 A1 Jun. 5, 2008

(30) Foreign Application Priority Data

Nov. 30, 2006 (JP) ............................. 2006-322742

(51) Int. Cl.
*G01R 35/00* (2006.01)
*G06F 11/273* (2006.01)
(52) U.S. Cl. .................... 702/80; 702/108; 702/121; 702/124; 702/126; 324/500
(58) Field of Classification Search .................. 702/80, 702/57, 58, 64, 108, 121, 124, 126
See application file for complete search history.

(56) References Cited

U.S. PATENT DOCUMENTS 4,339,943 A * 7/1982 Hedrick ...................... 73/1.63

5,691,926 A * 11/1997 Cannon et al. .............. 702/122
7,328,369 B2 * 2/2008 Manoni ....................... 714/11

FOREIGN PATENT DOCUMENTS

JP 2005-84941 A 3/2005

* cited by examiner

*Primary Examiner*—Hal D Wachsman
(74) *Attorney, Agent, or Firm*—Westerman, Hattori, Daniels & Adrian, LLP

(57) ABSTRACT

There is implemented an instrument check system for storing check data of an instrument for a long period of time in an instrument body in a stylized format. The instrument check system comprises an instrument provided with an AD converter for converting a voltage value applied to an input terminal into a digital value, a checking PC connected to the instrument so as to communicate with the instrument, a voltage generation unit for applying a checking voltage value to the input terminal, a check data storage unit formed in the instrument, wherein the checking PC comprises an input check means for acquiring data that is converted from the voltage value into the digital value by the AD converter upon giving an instruction to the voltage generation unit, and storing the data in the check data storage unit.

10 Claims, 4 Drawing Sheets

| CHECK TIME | PERSON IN CHARGE | INPUT IL | INPUT IH | ... | OUTPUT IL | ... | DETERMINATION |
|---|---|---|---|---|---|---|---|
| 2005/10/01 | KIKUCHI | 1.001V | 5.001V | ... | 1.000V | ... | OK |
| 2005/04/01 | MANO | 0.998V | 4.999V | ... | 1.001V | ... | OK |
| ... | ... | ... | ... | ... | ... | ... | ... |

1 : CONTROLLER

200 : CHECK DATA STORAGE SECTION

US 7,769,554 B2

INSTRUMENT CHECK SYSTEM

FIELD OF THE INVENTION

The invention relates to an instrument check system provided with either an AD converter for converting a voltage value applied to an input terminal into a digital value or a DA converter for converting an internal arithmetic value into a voltage value and applying the voltage value to an output terminal.

BACKGROUND OF THE INVENTION

Various instruments such as a controller, a temperature instrument, a recorder, etc. which are set and used for a long period of time in the same production facilities of a plant need periodic checks for keeping quality of produced goods. Since such production facilities are used for more than ten years, it is important to retain and administrate the check data. For the instrument check system, there is a technical disclosure in JP 2005-84941 A.

FIG. 4 is a functional block diagram showing a configuration of a conventional instrument check system applying to a controller by way of example. A controller to be operated in a plant has an input terminal 11 for receiving a measurement value PV of a sensor 2 applied as a voltage value and an output terminal 12 for outputting an operation value MV serving as a voltage value to a control valve 3.

Although not illustrated in FIG. 4, there is another input terminal for receiving a set value. Although one input terminal 11 and one output terminal 12 were illustrated for brevity of explanation, there are provided a plurality of input and output terminals, if need be.

In a steady-state control mode, the measurement value PV applied to the input terminal 11 is converted into a digital value by an AD converter 13, and is inputted to a control arithmetic section 14 via a switch S1 which is switched over when check is implemented.

The control arithmetic section 14 controls and operates the deviation between the measurement value PV and a set value to be inputted, although not illustrated, and delivers the resultant arithmetic value to a DA converter 15, via a switch S2 which is switched over when check is implemented, where the arithmetic value is converted into a voltage value, which is applied to a control valve 3 via an output terminal 12 as an operation value MV.

In a check mode, the input terminal 11 and the output terminal 12 are severed from the sensor 2 and the control valve 3. Instead, a set voltage value Vi of a voltage generation unit 41 of a tool 4 for use in checking (hereinafter referred to checking tool 4) is inputted to the input terminal 11, while a voltage value Vo' generated in the output terminal 12 is read by a voltage measurement unit 42 of the checking tool 4.

A set operation of the voltage generation unit 41 and read operation of the voltage measurement unit 42 are implemented by an operator 5 who is in charge of checking. In the check mode, the operator 5 switches over the switches 1 and 2 by an operation section 16 provided in the controller 1, and severs the input and the output of the control arithmetic section 14 from the AD converter 13 and the DA converter 15.

An output Vi' of the AD converter 13 is inputted to and displayed on a display section 17 provided in the controller 1 via the switch S1, and its display data is read by the operator 5. Further, an output checking voltage Vo, which is generated in a compulsory output section 18 provided in the controller 1 based on an instruction from an operation section 16 to the compulsory output section 18 by the operator 5, is inputted to the DA converter 15 via the switch S2.

The voltage Vo' to be generated in the output terminal 13 by the DA converter 15 for receiving the output checking voltage Vo is measured by the voltage measurement unit 42 of the checking tool 4, and the measurement data to be displayed is read by the operator 5.

The operator 5 self-determines as to whether set contents of the voltage generation unit 41 and the operation section 16, read values of the display data and the displayed data of the display section 17 and the voltage measurement unit 42 are within accuracy, respectively, and the result of self-determination is manually written in a check sheet 6. The check sheet 6 which is prepared for every periodic checking is retained for a long period of time over an operation period of the instrument as a storage check sheet 6'.

There are following problems in the conventional instrument check system.

(1) There is no stylized format in a paper check sheet so that a customer or an operator has prepared the check sheet by himself of herself. Accordingly, there is a possibility that omission of data occurs and ambiguity remains in a go/no-go check.

(2) Since the check data is paper media and is retained in a place different from the place where an instrument serving as a check object is kept, it is difficult to match between an instrument body and a check history.

SUMMARY OF THE INVENTION

The invention has been made to solve the forgoing problems and it is an object of the invention to realize an instrument check system for storing check data of the instrument in the instrument body in a stylized format for a long period of time.

To achieve the above object, the instrument check system of the invention is configured as follows.

(1) the instrument check system comprises an instrument provided with either an AD converter for converting a voltage value applied to an input terminal into a digital value or a DA converter for converting an internal arithmetic value into a voltage value and applying the voltage value to an output terminal, a checking PC connected to the instrument so as to communicate with the instrument, at least either a voltage generation unit for applying a checking voltage value to the input terminal and a voltage measurement unit for measuring the voltage value of the output terminal, a check data storage unit formed in the instrument, wherein the checking PC comprises at least an input check means for acquiring data that is converted from the voltage value into the digital value by the AD converter upon giving an instruction to the voltage generation unit, and storing the data in the check data storage unit, and an output check means for acquiring voltage measurement data generated in the output terminal from the voltage measurement unit upon giving an instruction to the DA converter, and storing the measurement data in the check data storage unit.

(2) The checking PC may determine the data acquired by at least either the input check means or the output check means based on a given threshold value, and the instrument check system further comprises a diagnosis means for storing the result of determination in the check data storage unit.

(3) The checking PC may acquire the data stored in the check data storage unit and provide a user with the data directly or via a network in a stylized format.

(4) The checking PC may implement at least either a set instruction of the voltage value relative to the voltage generation unit via a network or acquisition of measurement data of the voltage measurement unit via the network.

(5) The checking PC may implement at least either an instruction of the voltage value to be set in the voltage generation unit relative to an operator or acquisition of measurement data of the voltage measurement unit read by the operator.

According to the invention, the following effects can be expected.

(1) Since the check data is prepared in a stylized format together with a collateral information such as a time stamp, determination information, and so forth, the difference in preparation of the check data among individuals such as a customer and an operator is eliminated, namely, the check data is prepared without individuals, thereby reducing omission of data and ambiguity in a go/no-go check.

(2) The check data is stored for a long period of time in the instrument body serving as the diagnosis object as electronic data and it is possible to read data while specifying arbitrary time period so that intrinsic information such as secular change of the instrument and so forth can be easily acquired.

PREFERRED EMBODIMENT OF THE INVENTION

The invention is now described more in detail with reference to the accompanying drawings.

Figure 1:
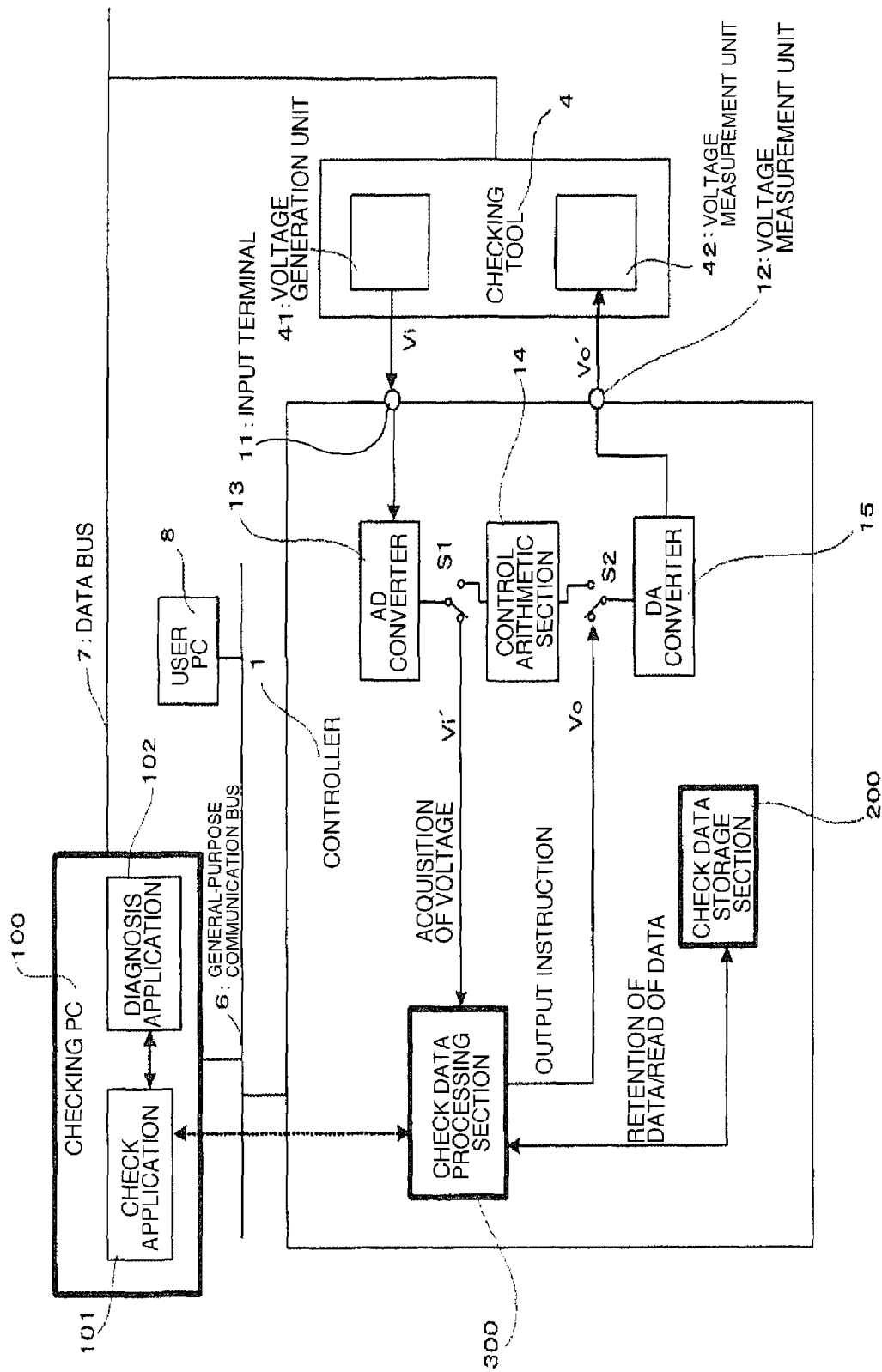
FIG. 1 is a functional block diagram showing an embodiment of an instrument check system to which the invention is applied.
Figure 4:
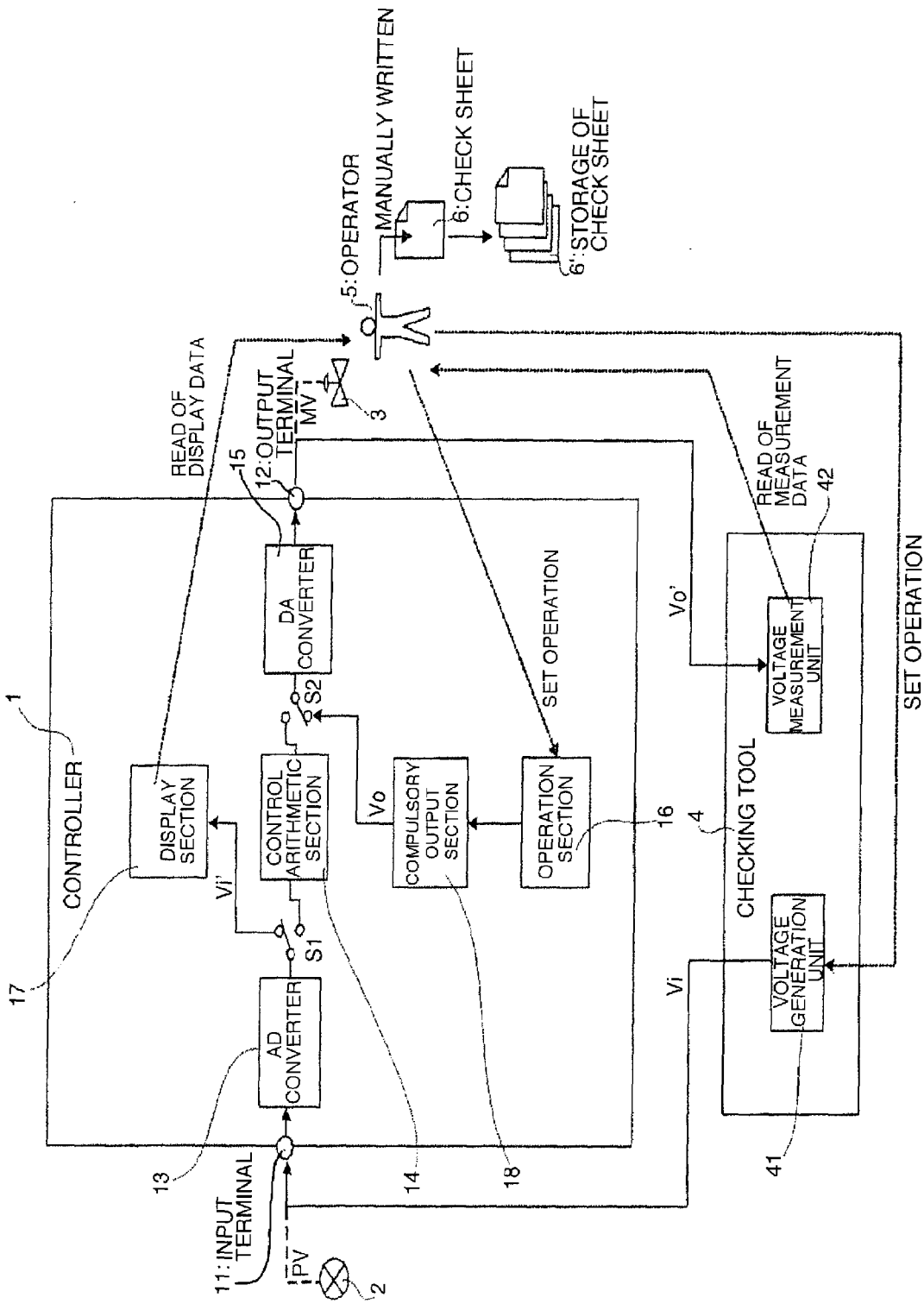
FIG. 4 is a functional block diagram showing a configuration of a conventional instrument check system by way of example.

FIG. 1 is a functional block diagram showing an embodiment of an instrument check system to which the invention is applied to a controller. In the figure, constituent elements identical to those of the conventional instrument check system as explained with reference to FIG. 4 are denoted by like reference numerals, thereby omitting description thereof.

The feature of the invention resides in a PC 100 for use in checking (hereinafter referred to checking PC 100) which is connected to a controller 1 via a general-purpose communication bus 6 so as to communicate with each other, a check data storage section 200 formed in the controller 1, and a check data processing section 300 formed in the controller 1.

A check application 101 and a diagnosis application 102 linked up with the check application 101 are installed in the checking PC 100, wherein each sequence of the check and diagnosis of the controller 1 is administrated and executed by the checking PC 100.

The checking PC 100 and a checking tool 4 are connected to each other by a data bus 7 so as to communicate with each other, and a voltage set instruction from the check application 101 to a voltage generation unit 41 and acquisition of measurement data by a voltage measurement unit 42 are executed via the data bus 7.

In an input terminal check mode, a voltage value Vi to be applied from the check application 101 to an input terminal 11 based on the voltage set instruction to the voltage generation unit retainer 41 via the data bus 7 is converted into a digital value Vi' by an AD converter 13. The check data processing section 300 acquires the digital value Vi' via a switch S1 and delivers it to the check application 101.

The check application 101 adds a time stamp to the acquired digital value Vi' and transfers it to the check data storage section 200 via the check data processing section 300 in the controller 1 where it is stored in a stylized format.

Further, the check application 101 delivers the acquired digital value Vi' to the diagnosis application 102 and causes it to be determined based on a given threshold value, then acquires the result of determination, which is transferred to the check data storage section 200, where the result of determination is stored in a stylized format.

In an output check mode, the check application 101 inputs the output checking voltage Vo to the DA converter 15 via the check data processing section 300. The output voltage value Vo' of the DA converter 15 generated in the output terminal 12 is measured by the voltage measurement unit 42.

The check application 101 acquires this measurement data Vo' via the data bus 7. The check application 101 adds a time stamp to the acquired digital value Vo' and transfers it to the check data storage section 200 where it is stored in a stylized format.

Further, the check application 101 delivers the acquired digital value V0' to the diagnosis application 102 and causes it to be determined based on a given threshold value, then acquires the result of determination, which is transferred to the check data storage section 200, where the result of determination is stored in a stylized format.

The checking PC 100 reads the data stored in the check data storage section 200 while specifying an arbitrary storage time period, and can supply the same data to a user PC 8 in a stylized format directly or via a network.

Figure 2:
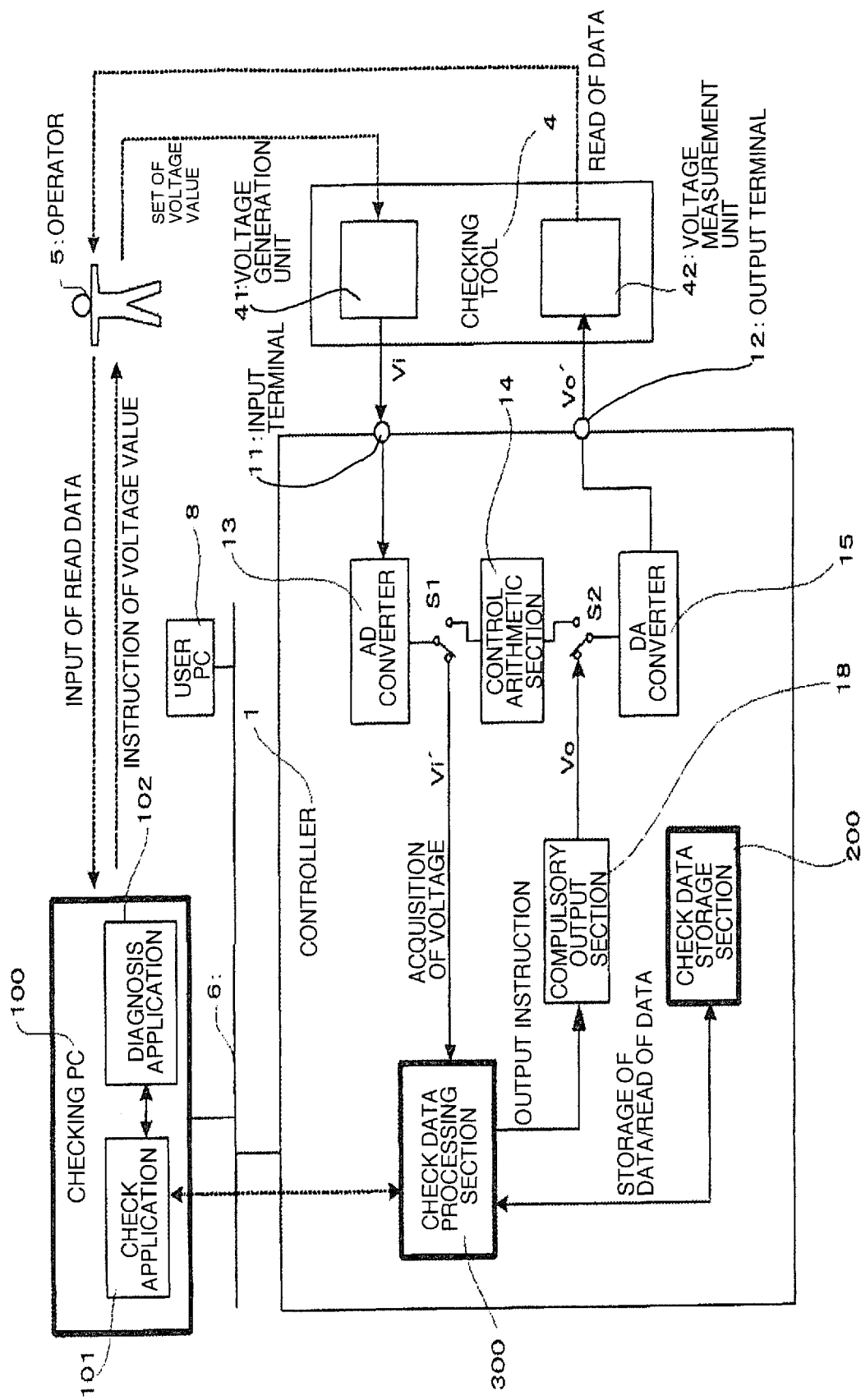
FIG. 2 is a functional block diagram showing another embodiment of the invention.

FIG. 2 is a functional block diagram showing another embodiment of the invention. The configuration of the second embodiment is different from that of the first embodiment in respect of information transmission between a checking PC 100 and a checking tool 4 which is made via an operator 5 instead of data bus 7 in FIG. 1. The configuration of this system is suitable for a check operation at the site where the instrument is installed.

The operator 5 reads a voltage instruction value displayed on a display section of a checking PC 100, then operates a voltage generation unit 41 and sets an instructed voltage value Vi in an input terminal 11 of a controller 1. The operator 5 reads a measurement data of a voltage value Vo' of an output terminal 12 which is displayed on a voltage measurement unit 42 and inputs it to the checking PC 100 via a keyboard of the checking PC 100.

In the case where the controller 1 is provided with a compulsory output section 18, as explained with reference to FIG. 4, a check application 101 of the checking PC 100 can have a configuration for causing a check data processing section 300 to give an instruction to the compulsory output section 18 so as to supply an output checking voltage Vo to the DA converter 15.

Figure 3:
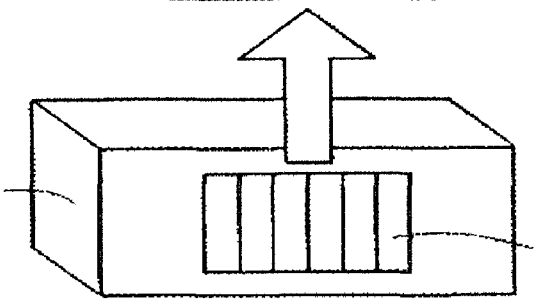
FIG. 3 is an image view showing a check history data to be stored in a check data storage section by way of example.

FIG. 3 is an image view showing a check history data to be stored in a check data storage section 200 by way of example. The check data storage section 200 is configured by a nonvolatile memory, wherein if it secures a capacity to store check data for 20 times, it can store the check data for 10 years in the case of check cycle of 6 months while it can store the check data for 20 years in the case of check cycle of 1 year.

The invention is characterized in the configuration for storing data to be acquired in the check data storage section formed in the interior of the instrument serving as the check object per se. With such configuration, the checking PC is not necessary to be provided with resources for storing the check data or a data administration program. Accordingly, even if the checking PC 100 is changed during a long period of operation time of the instrument, the check administration can be continued by merely installing the application alone.

According to the first and second embodiments as shown in FIG. 1 and FIG. 2, although the controller having the input terminal and the output terminal is exemplified as the instrument serving as the check object, the invention can be applied to the check of an instrument provided with an input section alone or an output section alone such as a display, a recorder, an input module, an output module and so forth.

What is claimed is:

1. An instrument check system comprising:
   an instrument provided with at least an AD converter for converting a voltage value applied to an input terminal into a digital value;
   a checking personal computer (PC) connected to the instrument so as to communicate with the instrument;
   at least a voltage generation unit for applying a checking voltage value to the input terminal;
   a check data storage unit formed in the instrument;
   wherein the checking PC comprises at least an input check means for acquiring data that is converted from the voltage value into the digital value by the AD converter upon giving an instruction to the voltage generation unit, and storing the data in the check data storage unit.

2. The instrument check system according to claim 1, wherein the checking PC determines the data acquired by at least the input check means based on a given threshold value, and further comprises a diagnosis means for storing the result of the determination in the check data storage unit.

3. The instrument check system according to claim 1, wherein the checking PC acquires the data stored in the check data storage unit and provides a user with the data directly or via a network in a stylized format.

4. The instrument check system according to claim 1, wherein the checking PC implements at least a set instruction of the voltage value relative to a voltage of the voltage generation unit via a network.

5. The instrument check system according to claim 1, wherein the checking PC implements at least a display of the voltage value to be set in the voltage generation unit.

6. An instrument check system comprising:
   an instrument provided with at least a DA converter for converting an internal arithmetic value into a voltage value and applying the voltage value to an output terminal;
   a checking personal computer (PC) connected to the instrument so as to communicate with the instrument;
   at least a voltage measurement unit for measuring the voltage value of the output terminal;
   a check data storage unit formed in the instrument;
   wherein the checking PC comprises at least an output check means for acquiring voltage measurement data generated in the output terminal from the voltage measurement unit upon giving an instruction to the DA converter, and storing the measurement data in the check data storage unit.

7. The instrument check system according to claim 6, wherein the checking PC determines the data acquired by at least the output check means based on a given threshold value, and further comprises a diagnosis means for storing the result of the determination in the check data storage unit.

8. The instrument check system according to claim 6, wherein the checking PC acquires the data stored in the check data storage unit and provides a user with the data directly or via a network in a stylized format.

9. The instrument check system according to claim 6, wherein the checking PC implements at least acquisition of measurement data of the voltage measurement unit via the network.

10. The instrument check system according to claim 6, wherein the checking PC implements at least acquisition of measurement data of the voltage measurement unit read by the operator.

\* \* \* \* \*